April 1, 1924.

L. J. ROHRBOUGH

AUTOMATIC AUTOMOBILE JACK

Filed July 8, 1922

Inventor:
L. J. ROHRBOUGH,
By W. J. FitzGerald & Co.
Attorney.

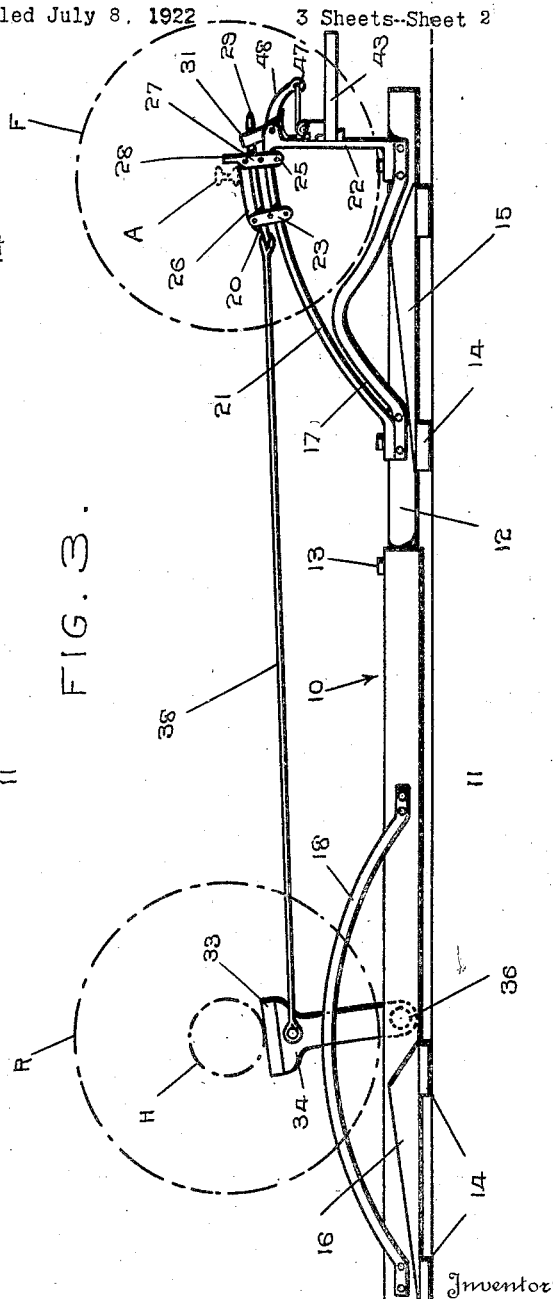

April 1, 1924. 1,489,154
L. J. ROHRBOUGH
AUTOMATIC AUTOMOBILE JACK
Filed July 8, 1922  3 Sheets-Sheet 3
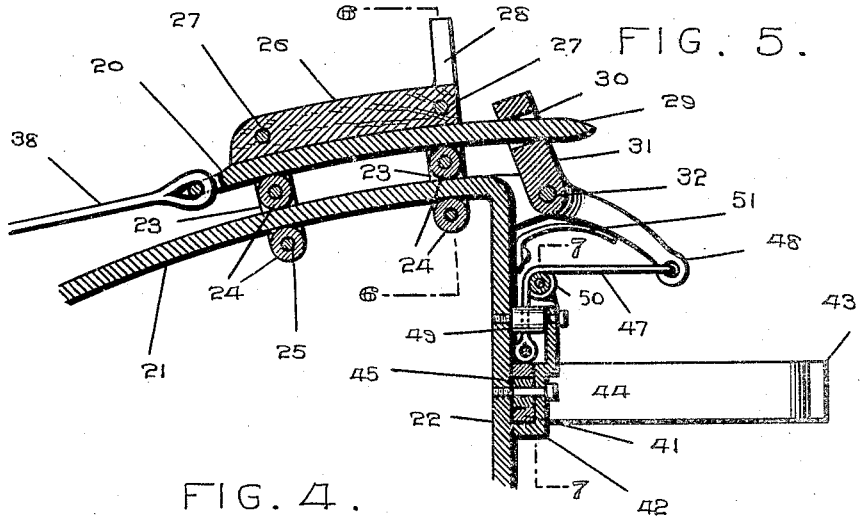
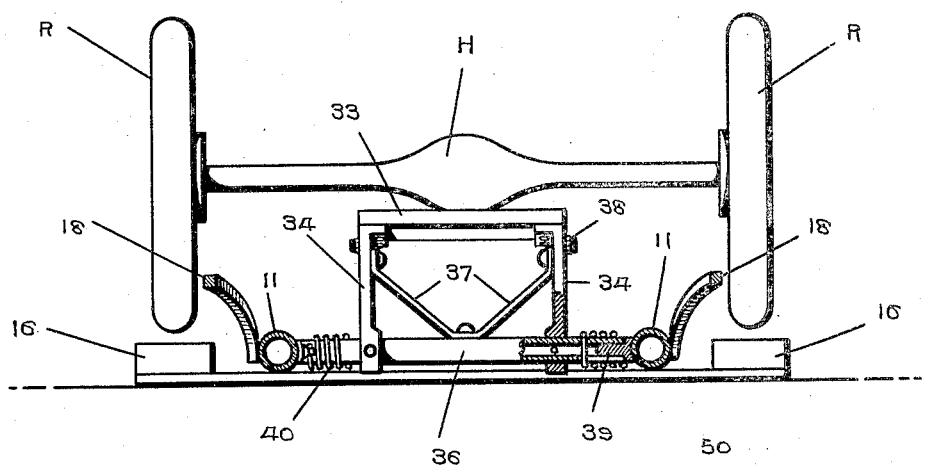
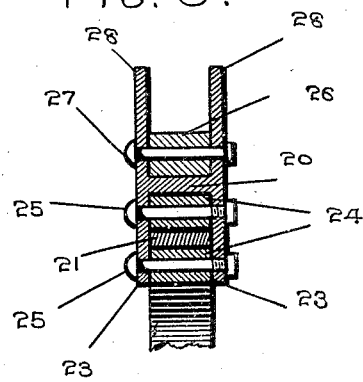
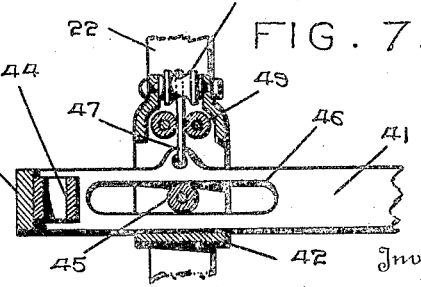
Inventor:
L. J. ROHRBOUGH,
By W. J. FitzGerald & Co.
Attorney.

Patented Apr. 1, 1924.

1,489,154

UNITED STATES PATENT OFFICE.

LEE J. ROHRBOUGH, OF OMAHA, NEBRASKA.

AUTOMATIC AUTOMOBILE JACK.

Application filed July 8, 1922. Serial No. 573,515.

*To all whom it may concern:*

Be it known that I, LEE J. ROHRBOUGH, a citizen of the United States, residing at Omaha, in the county of Douglas and State of Nebraska, have invented certain new and useful Improvements in Automatic Automobile Jacks; and I do hereby declare the following to be a full, clear, and exact description of the invention, such as will enable others skilled in the art to which it appertains to make and use the same.

The present invention relates generally to automobile jacks, and aims to provide a novel and improved contrivance onto which an automobile can be run for supporting the machine in an efficient manner, while in live or dead storage, with the tires off of the floor or ground and relieved of the weight of the machine.

Another object is the provision of such a jack having inclines on which the wheels of the automobile can ascend under the power of the machine, and means so arranged as to catch and support the machine when the wheels run off of the inclines, whereby the weight of the machine is taken off the tires and the machine so supported as to not only jack up the machine, but to also enable the machine to be tested under its own power or worked on in an untrammeled manner because of the wheels being removed from the floor or ground.

A further object is to provide a jack having such means that the vehicle is supported, and retained in supported position against gravity, whereby the supporting means can be released for the return of the wheels to the inclines and floor or ground automatically.

A still further object is the provision of an automatic automobile jack having means for supporting the machine when elevated, and novel means whereby a supporting means can be released by the operator seated in the car, for the automatic return of the wheels to the floor or ground without the operator leaving his seat.

It is also an object of the invention to provide a jack which is adjustable for automobiles having different wheel bases.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a side elevation of the device showing same in set position.

Fig. 3 is a similar side elevation showing the parts in position as when supporting the vehicle.

Fig. 4 is a cross section substantially on the line 4—4 of Fig. 1.

Fig. 5 is an enlarged sectional detail taken on the line 5—5 of Fig. 1.

Figure 1:
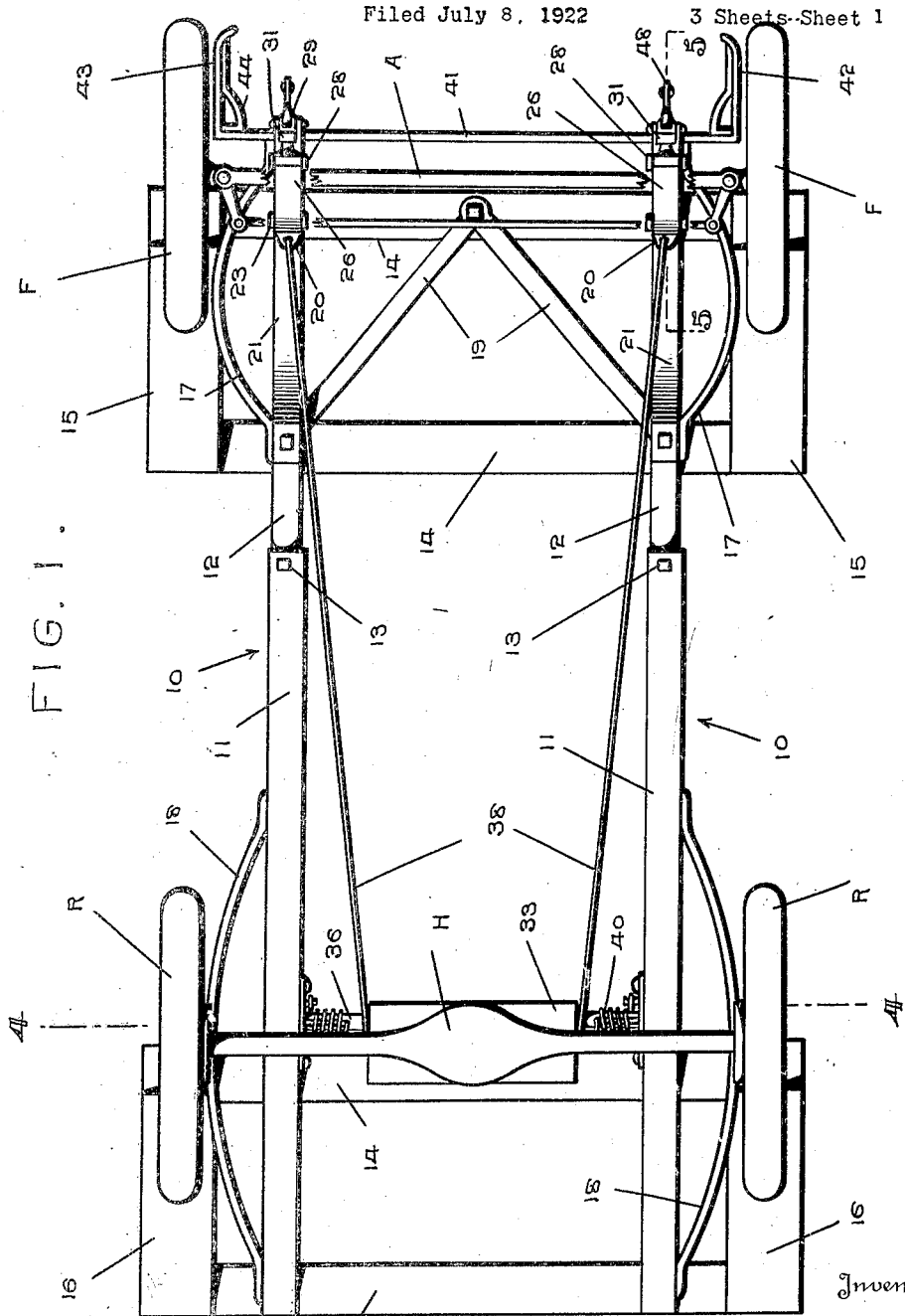
Figure 1 is a plan view of the jack with the axles of a motor vehicle supported thereon.

Figs. 6 and 7 are sectional details taken on the respective lines 6—6 and 7—7 of Fig. 5.

The frame or base of the jack, which rests unsecured on the floor or ground, may be of any suitable size, and, as shown, has the longitudinal parallel side rails 10 composed of the sections 11 and 12 telescoped together slidably, for adjusting the length of the frame for different wheel bases of automobiles, the sections 11 which are tubular for receiving the sections 12 having set screws 13 or other means for clamping the sections together in their adjusted position. The end portions of the rail are secured on transverse or cross bars 14, which have their terminals projecting beyond the rails, and front inclines 15 and rear inclines 16 are secured on the projecting terminals of the front and rear bars 14. Said inclines are so arranged that the wheels of the vehicle roll on the inclines when the automobile is run onto the jack. Curved front and rear guides 17 and 18, respectively, are secured at their ends to the rails and are bowed away from the rails, for guiding the wheels of the machine to move over the inclines and thus providing for the proper co-relation of the machine and jack when the machine is moved over the jack. The frame may be braced, as at 19, to stiffen and strengthen it.

The front axle A of the vehicle is supported on carriers or slides 20 above the forward terminals of the rails 10, and said carriers are movable on inclined rails or guides 21 having their rear lower ends secured on the front sections 12 of the frame rails 10, and having their upper forward ends supported by posts 22 which have their feet secured on said sections 12 also. The carriers 20 have the side members 23 between which rollers 24 are disposed under the carriers above and below the rails 21 for the free and easy rolling motion of the carriers along said rails 21. Axles 25 for the rollers are engaged through the side members 23 of the carriers, and axle cushions 26 are disposed on the carriers. Said cushions 26 are preferably blocks of wood, for supporting the front axle without chafing or scratching it, and to also provide sufficient friction to prevent the axle sliding off the carriers. The cushions or blocks 26 are secured on the carriers by securing bolts or elements 27 engaged transversely through said cushions and side members 23. The forward side members 23 of the carriers have extensions 28 projecting above the cushions or blocks 26 for the contact of the front axle when moved over the rails 21 during the movement of the vehicle onto the jack.

In order to hold or latch the carriers 20 in their forward position, when the front axle has moved said carriers forwardly for the support of said axle from the jack, said carriers have tongues 29 projecting from their forward ends to pass through the openings 30 of binding or gripping latches 31 pivoted, as at 32, to the upper ends of the posts or standards 22 at the forward ends of the rails 21. Thus, when the carriers are moved forwardly, the tongues 29 are shoved through the latches 31, which in swinging backwardly will bind or grip on the tongues 29, for preventing the carriers moving rearwardly until the latches are swung forwardly to releasing position.

The rear axle of the vehicle is supported on a rocker support or yoke having the wooden cushion or plate 33 on which the rear axle housing H is seatable. Said cushion or plate 33 is secured on upwardly extending arms 34 which are secured on a transverse rock shaft 36 mounted in the frame, for the forward and rearward rocking movement of said support or yoke. The arms 34 can be braced, as at 37, and said rocking support remains in rear of the vertical line or plane of equilibrium, whereby said support has a tendency to swing rearwardly by gravity. The rocking support is connected to the slidable carriers 20 by means of cables 38 or other suitable connections, whereby when the carriers 20 are moved forwardly with front axle, the rocking support is swung forwardly under the rear axle, thereby positioning said rocking support for receiving the rear axle thereon when the rear wheels R roll off the rear inclines 16.

In order to swing the rear rocking support rearwardly and to pull the carirers 20 rearwardly, when the vehicle moves off of the jack, coiled torsion springs 40 are disposed on the end portions of the shaft 36. Said shaft 36 is preferably tubular, and has its end portions mounted for rotation on the pintles 39 of bearings secured to the rails 10, and the springs 40 are connected to the shaft 36 and said bearings, for turning the shaft to swing the rocker support rearwardly.

Means is provided for the automatic release of the carriers 20 by the movement of the steering gear of the machine, in order that the driver or occupant can readily release the supporting means for the return of the machine to the floor or ground. Thus, a transverse release bar 41 is slidable across the front sides of the posts 22 in suitable guides 42 carried by said posts, and said bar is provided at its ends with forwardly-extending arms 43 which can be braced, as at 44. Said arms 43 are so arranged as to be engaged by the front wheels F of the automobile when said front wheels are angled, for sliding the bar 41 in one direction or the other. Said bar slides longitudinally of itself transversely of the frame, and the bar may be supported for free and easy movement by rollers 45 in the guides 42 disposed in longitudinal slots 46 in said bar. The bar 41 is operatively connected with the latches 31 by means of cords or flexible elements 47 connected to the bar and to arms 48 of the latches. Said flexible elements 47 pass between rollers 49 in said guides and over other rollers 50, for guiding said elements, so that when the bar 41 is moved in either direction, the elements 47 are pulled under one roller 49 of each pair, and over the rollers 50, for swinging the arms 48 rearwardly and moving the latches 31 forwardly to releasing position. Springs 51 are provided for swinging the latches 31 rearwardly to gripping position to automatically engage the tongues 29 when said tongues are moved forwardly through the latches.

The operation of the machine is as follows: When the jack is in set position for receiving the automobile thereon, the rear rocker support is swung rearwardly and downwardly by the springs 40, as seen in Fig. 2, and the cables 38 pull the carriers 20 rearwardly and downwardly on the guide rails 21. The frame or base is adjusted to the proper length according to the wheel base of the automobile to be supported, and the cables 38 are of a corresponding length for properly connecting the front and rear axle supports. The automobile is run forwardly slowly over the jack, the front wheels F first passing over the rear inclines 16, and the rear rocker support is swung rearwardly sufficiently low down so as not to interfere with the front axle A in passing over the rear portion of the frame. The forward ends of the inclines are also inclined so that the wheels can pass off of the inclines without a jolt or jar. The guards or guides 18 direct the front wheels over the rear inclines 16, and then as the automobile passes completely over the frame, the front wheels F run up the front inclines 15 and, at the same time, the rear wheels R ascend the rear inclines 16. The machine thus ascends the inclines under its own power, and the machine is thus elevated by itself. When the front wheels ascend the front inclines 15, the front axle A strikes the projections or portions 28 of the carriers 20, and moves said carriers forwardly with the front axle under said axle, so that the axle can seat on the cushions 26 as the front wheels leave the inclines 15 under the inertia of the vehicle. At the same time, the carriers 20 being moved forwardly will cause the cables 38 to pull the rear rocker support forwardly, to carry the cushion 33 under the rear axle housing H, and said rear axle housing seats on and is supported by said rear support as the rear wheels leave the rear inclines 16. The weight of the machine is thus transferred from the tires and inclines to the front and rear axle supports, and the machine moves under its own power up the inclines and there is sufficient inertia to carry the wheels slightly beyond the forward upper ends of the inclines, with the tires relieved of the weight of the machine and clear of the floor and inclines. The motion of the machine moving the carriers 20 forwardly, will shove the tongues 29 through the latches 31, and said latches swinging rearwardly under the tension of the springs 51 will grip said tongues and hold the carriers 20 and rear axle support in their forward position. If the vehicle did not have sufficient motion to carry itself forward sufficiently for the support of the axles from the carriers 20 and rear support, the machine will move back by gravity to return the wheels to the inclines, and the machine can then be driven up the inclines to gain sufficient inertia to carry it forward to supporting position, as seen in Fig. 3.

Any number of attempts may be made to move the machine into position, and experience will enable the driver to move onto the jack without difficulty. The carriers 30 reaching the forward ends of the rails 21 and being limited in their forward movement, will serve as a buffer for stopping the movement of the machine. With the carriers 20 held by the latches 31, the vehicle is supported against gravity, inasmuch as the carriers 20 tend to gravitate rearwardly down the incline rails 21, and the rear rocker support, although swung forwardly, is still in rear of the vertical line of equilibrium, so that the rear support tends to swing rearwardly under the weight imposed thereon. The machine is thus supported against gravity tending to carry the machine rearwardly back on the inclines. The movement of the machine from the inclines to the axle supports is accomplished with little effort, and said axle supports receive the axles thereon and carry the axles the moment the wheels start off the inclines, thereby loading the machine on the jack without complications and with the movement of but very few parts of the jack. The jack can be used for supporting the vehicle for live or dead storage, or for the testing of the vehicle and adjustments or repair thereof.

In moving on the jack, the front and rear wheels are guided on the inclines by the guides or guards 17 and 18, and the front wheels F are disposed at the outer sides of the arms 43, whereby the vehicle can be conveniently let down backwardly. To back the vehicle off the jack, the operator enters the vehicle, and while seated turns the steering wheel either way, so that the front wheels F are angled, causing one of said front wheels to contact with the corresponding arm 43 and slide the bar 41 in the corresponding direction. Said bar being slid will pull the flexible elements 47 and swing the arms 48 to move the latches 31 forwardly to releasing position, thereby releasing the carriers 20. The carriers 20 and rear axle support will therefore move rearwardly under the weight of the machine, and this will return the wheels rearwardly to the inclines, and the traction of the wheels is thus restored at the same point where the wheels left the inclines and the axle supports became sponsor for carrying the vehicle. The machine can thus roll backwardly off of the inclines, and the operator can then manipulate the vehicle for backing completely off of the jack.

When the machine is thus released and backed off of the jack, the rear rocker support is swung rearwardly with the car and the cables 38 pull the carriers 20 rearwardly, thereby automatically resetting the jack for the return of the vehicle thereon, and the jack remains prepared and set for the subsequent reception of the vehicle thereon. The jack is thus entirely automatic in operation, for jacking up the machine when the machine is run onto the jack, and for releasing the machine to back off of the jack by the simple movement of the steering gear.

Having thus described the invention, what is claimed as new is:—

1. A vehicle jack comprising means for receiving and supporting the vehicle against gravity, means for holding said means to support the vehicle against gravity, and means controlled by the steering gear of the supported vehicle for controlling said holding means to release the supporting means.

2. A vehicle jack including means movable with a vehicle to support same in raised position and movable reversely for letting the vehicle down, means for holding said means with the vehicle raised, and means controlling said holding means and adapted to be controlled by the steering gear of the supported vehicle for releasing the first named means to move reversely.

3. A vehicle jack comprising means for supporting a vehicle against gravity, and means for holding the supporting means against return movement including a device under the control of a wheel of the vehicle for releasing the supporting means by the movement of said wheel.

4. A vehicle jack comprising supporting means movable with a vehicle for supporting the vehicle off the floor against gravity, latching means for holding said means when supporting the vehicle, and means adapted to be moved by one of the steering wheels of the vehicle and controlling the latching means to release the supporting means.

5. A vehicle jack comprising supporting means movable with a vehicle for supporting same and movable reversely to let the vehicle down, latching means for holding the supporting means with the vehicle raised, and a movable member operatively connected with the latching means and having portions for the contact of the steering wheels of the vehicle in order to release the latching means from the supporting means.

6. A vehicle jack comprising a frame, axle carriers movable on the frame with an axle of the vehicle for supporting said axle when raised and movable reversely with the vehicle for letting the vehicle down, latches carried by the frame for engaging and holding said carriers when moved to a position with the axle raised and supported by said carriers, and a bar slidable on the frame and operatively connected with said latches, said bar having portions for the contact of the steering wheels to move said bar for releasing the latches from the carriers.

7. A vehicle jack comprising means for supporting a vehicle, and means for holding said supporting means with the vehicle raised and controlled by a wheel of the vehicle for releasing the supporting means by the movement of said wheel.

In testimony whereof I have signed my name to this specification in the presence of two subscribing witnesses.

LEE J. ROHRBOUGH.

Witnesses:
 EPES CORY,
 A. H. TRAULSEN.